(12) United States Patent
Allebach et al.

(10) Patent No.: US 8,396,320 B2
(45) Date of Patent: Mar. 12, 2013

(54) METHOD AND APPARATUS FOR DETERMINING THE STRAY-LIGHT POINT-SPREAD FUNCTION OF AN IMAGING SYSTEM

(75) Inventors: Jan P. Allebach, West Lafayette, IN (US); Burak Bitlis, West Lafayette, IN (US); Peter Allan Jansson, Hockessin, DE (US); Jianing Wei, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 596 days.

(21) Appl. No.: 12/523,351

(22) PCT Filed: Jan. 18, 2008

(86) PCT No.: PCT/US2008/051397
§ 371 (c)(1),
(2), (4) Date: Jan. 15, 2010

(87) PCT Pub. No.: WO2008/089385
PCT Pub. Date: Jul. 24, 2008

(65) Prior Publication Data
US 2010/0135594 A1    Jun. 3, 2010

Related U.S. Application Data

(60) Provisional application No. 60/885,777, filed on Jan. 19, 2007.

(51) Int. Cl.
*G06K 9/40*      (2006.01)
(52) U.S. Cl. ....................... 382/274; 382/275
(58) Field of Classification Search .................. 382/274, 382/275
See application file for complete search history.

(56) References Cited

U.S. PATENT DOCUMENTS

| | | | | |
|---|---|---|---|---|
| 5,153,926 | A * | 10/1992 | Jansson et al. | 382/128 |
| 6,829,393 | B2 * | 12/2004 | Jansson | 382/275 |
| 7,120,309 | B2 * | 10/2006 | Garcia | 382/275 |
| 2002/0196472 | A1 * | 12/2002 | Enomoto | 358/3.26 |
| 2003/0053712 | A1 * | 3/2003 | Jansson | 382/275 |
| 2003/0086624 | A1 * | 5/2003 | Garcia | 382/275 |
| 2008/0240607 | A1 * | 10/2008 | Sun et al. | 382/275 |
| 2009/0263043 | A1 * | 10/2009 | Cristobal Perez et al. | 382/275 |

OTHER PUBLICATIONS

Jansson et al., "Correction Color-Measurement Error Caused by Stray Light in Image Scanners," Nov. 17-20, 1998, The Sixth Color Imaging Conference: Color Science, Systems, and Applications, pp. 69-73.*
International Search Report and Written Opinion for PCT/US2008/051397 completed Jul. 1, 2008.
Jansson, P.A., and Breault, R. P. (1998). "Correcting color-measurement error caused by stray light in image scanners," The Sixth Color Imaging Conference: Color Science, Systems, and Applications, Nov. 17-20, 1998, Scottsdale, Arizona, pp. 69-73.

(Continued)

*Primary Examiner* — John Strege
(74) *Attorney, Agent, or Firm* — Barnes & Thornburg LLP

(57) ABSTRACT

A method of determining the point-spread function (PSF) of an imaging system includes the steps of capturing image data, establishing an idealized source spot, establishing a functional form model, subtracting the captured image from the estimated image equation and determining a metric that measures the fit of the estimated image to the captured image. The functional form model may include both diffraction and aberration and stray light. The functional form model may be optimized to reduce the metric to an acceptable level.

19 Claims, 8 Drawing Sheets

OTHER PUBLICATIONS

Jansson, P.A., ed. (1997), "Deconvolution of Images and Spectra," p. 85. Academic Press, New York.

Coleman, T.F. and Y. Li (1996), "An Interior Trust Region Approach for Nonlinear Minimization Subject to Bounds," SIAM Journal on Optimization, vol. 6, pp. 418-445.

Coleman, T.F. and Y Li, (1994). "On the Convergence of Reflective Newton Methods for Large-Scale Nonlinear Minimization Subject to Bounds," Mathematical Programming, vol. 67, No. 2, pp. 189-224.

Tatian, B. (1965). "Method for obtaining the transfer function from the edge response function," J. Opt. Soc. Am. 55, 1014-1019.

Barrett, H.H., and Swindell, W. (1981). "Radiological Imaging," 2-vol. Ed., V. 1, pp. 59-61. Academic Press, New York.

Bely, P.Y., et al. (1999). "Straylight analysis of the Yardstick Mission, "NGST Monograph No. 2, Next Generation Space Telescope Project Study Office, Goddard Spaceflight Center, Greenbelt, MD.

Hall, M M., Jr. (1977). "The approximation of symmetric X-ray peaks by Pearson type VII distributions," J. Appl. Cryst. 10, 66-68.

Press, W.H., et al., (1992). "Numerical recipes in FORTRAN, the art of scientific computing," second edition. pp. 402-406. Cambridge University Press, New York.

Judd, D. B., and Wyszecki, G. (1975). "Color in Business, Science and Industry," third edition, p. 125.

Sharma, G. (2003). "Digital Color Imaging Handbook," first edition, pp. 269-385.

* cited by examiner

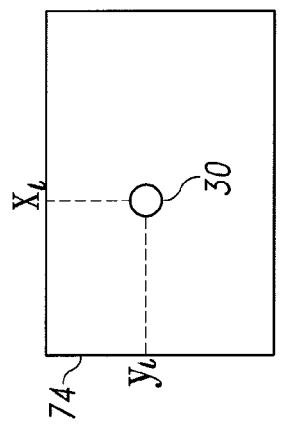
Fig. 9
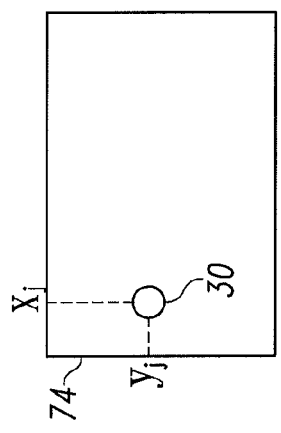
Fig. 10
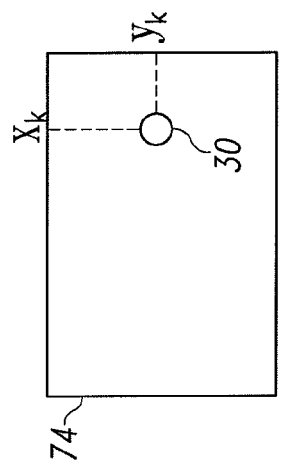
Fig. 11
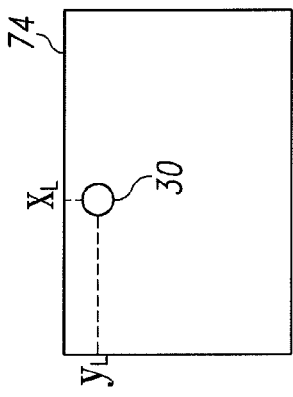
Fig. 12
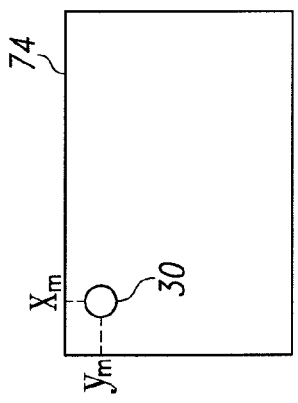
Fig. 13
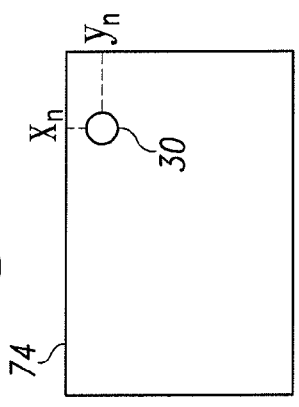
Fig. 14
Fig. 15
Fig. 16
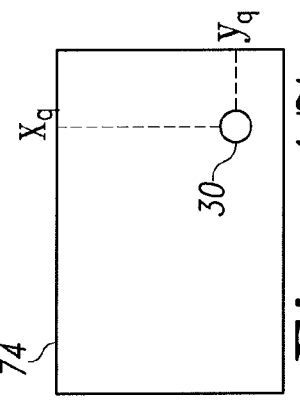
Fig. 17

METHOD AND APPARATUS FOR DETERMINING THE STRAY-LIGHT POINT-SPREAD FUNCTION OF AN IMAGING SYSTEM

CROSS-REFERENCE TO RELATED APPLICATIONS

This application is a U.S. national stage application under 35 U.S.C. §371 of international application serial no. PCT/US2008/051397 filed Jan. 18, 2008, which claims the benefit under 35 U.S.C. §119(e) of U.S. provisional patent application Ser. No. 60/885,777, filed Jan. 19, 2007, the entirety of the disclosure of which are incorporated herein by reference.

BACKGROUND OF THE INVENTION

The present disclosure is directed to a method and apparatus for characterizing and correcting misdirected imaging flux in an imaging system.

All imaging systems experience stray light flux. Imaging systems are victimized by phenomena that misdirect a small portion of the entering flux to undesired locations in the image. The term "imaging systems" as used herein includes, for example, optical systems, x-ray systems, and computerized tomography systems. Among optical systems of particular interest are digital-camera optics, telescopes, and microscopes. Other systems that do not employ the directional passage of flux, such as magnetic resonance imaging systems, also fall within the term "imaging systems." Depending on the type of imaging system, the "image" may have a single dimension (a linear image), two dimensions (a planar image), three dimensions (a volume image), or more dimensions (a hyper image). In the most general sense the misdirected flux may be termed "stray-flux," although in the context of different systems, it is known by different terms such as "stray-light." Though it will be employed frequently throughout the present specification, particularly in conjunction with the illustrative embodiment, it should be appreciated that the term "stray-light" is synonymous with "stray-flux" for applications in which the latter terminology is more appropriate, or by other terms appropriate to their field of application.

Optical imaging systems may include many factors that misdirect a small portion of the entering light flux to undesired locations in the image plane. Among possible causes, these factors include but are not limited to: 1) Fresnel reflections from optical-element surfaces, as noted in U.S. Pat. No. 6,829,393, which typically result in ghost images, 2) diffraction at aperture edges, 3) scattering from air bubbles in transparent glass or plastic lens elements, 4) scattering from surface imperfections on lens elements, 5) scattering from dust or other particles, and 6) flux originating in focal planes other than the plane of interest. The misdirected flux, which is called by the terms "stray light," "lens flare", "veiling glare", "haze," and by other names, degrades both the contrast and the photometric accuracy of the image. For example, in photography, back-lighted scenes such as portraits that contain a darker foreground object suffer from poor contrast and reduced detail of the foreground object. In three-dimensional fluorescence microscopy that employs deconvolution for object reconstruction, stray fluorescence flux originating from planes other than that of interest can degrade the contrast of image detail and, in some cases, effectively obscure that detail.

Stray light also affects the color accuracy of an image. P. A. Jansson and R. P. Breault referred to a traditional simple manipulation of offset and gain, or contrast that can lessen subjective objections to stray-flux contaminated images. These manipulations, however, do not correct the underlying flaw in the image and do, in fact, introduce additional error. For a complete discussion of the effect of stray light on color accuracy, see Jansson, P. A., and Breault, R. P. (1998). "Correcting Color-Measurement Error Caused by Stray Light in Image Scanners," The Sixth Color Imaging Conference: Color Science, Systems, and Applications, Nov. 17-20, 1998, Scottsdale, Ariz., pp. 69-73.

U.S. Pat. No. 5,153,926, assigned to the assignee of the present disclosure, describes various embodiments of a method to remove the stray-flux effect from images. This method demands significant amounts of computation. Prior referenced U.S. Pat. No. 6,829,393 also assigned to the assignee of the present disclosure, describes a particularly efficient method and apparatus for effecting such removal. The method may be implemented within the imaging apparatus itself, a digital camera for example. Accurate removal of stray-flux effects first requires determination of the image forming system's property of misdirecting image-forming flux. More explicitly, the stray light point-spread function (PSF) of the system is required.

The PSF of an imaging system may be described by an integral. For a planar object, the flux imparted may be described by the function $o(x, y)$, which may be emitted from a spatially varying source of flux whose magnitude o varies with Cartesian coordinates x and y. Also, the source may be a reflective, transmissive, fluorescent or other object from which flux emanates with similarly varying magnitude. Generally, all of the flux emanating from the object falls within bounds on x and y, and the area of the object plane confined by those bounds may be called the object field. An imaging device, such as a camera lens, including all of its optical, mechanical and electrical components, may convey flux from the object plane onto an image plane. The magnitude of the flux falling on the image plane may be defined by the function $i(x, y)$. Generally all of the flux falling upon the image plane originates from the object. The flux quantities conveyed by various portions of the imaging device add in the detector plane by linear superposition such that a function $s(x, x'; y, y')$ characterizes the imaging device and the functioning of the imaging process is generally described by the integral Equation (1).

$$i(x,y) = \iint s(x,x';y,y') o(x,y) dx'dy' \qquad (1)$$

The function $s(x, x'; y, y')$ is designated as the PSF of the imaging system. In general, the mathematical expression for s comprises all contributions that may be identified. For example, contributions include (1) the behavior of a hypothetically perfect imaging system that would realize the image i as a perfect replication of the object o, though possibly spatially scaled, (2) diffractive spreading owing to the finite aperture of the imaging device, (3) aberrations arising from non-ideal aspects of device design, device fabrication materials limitations, or imperfect device fabrication or alignment, thereby giving rise to redistribution of flux, (4) so-called stray light or stray flux arising from flux misdirection such as Fresnel reflections and scattering as noted in the foregoing. Depending on the physical nature of these contributions and their interactions, combining them may employ simple addition, convolution, or other mathematical means.

Although a two-dimensional integral is used to describe the behavior of an imaging system, a one-dimensional integral may be similarly employed without any loss of generality by mere redefinition of the imaging kernel function s. This approach is discussed in "Deconvolution of Images and Spectra," p. 85. Academic Press, New York, 1997. Similarly, Equation (1) is applicable to stray flux and analogous effects in other systems, including those not employing the directional passage of flux, regardless of dimensionality, by redefining s. Only the central core of a camera's full point-spread function corresponds to the more traditional point-spread function.

Generally, such a PSF, i.e., s or its components, may be determined via experiment, directly or indirectly, or by a theoretical analysis or modeling calculation based on the design of the imaging system. That is, the PSF may take the form of, or be derived from, certain response coefficients, which may be calculated based on the imaging system's design as noted in U.S. Pat. No. 5,153,926. In the case of an optical imaging system, formulas based on the laws of physics and/or experimental data may be used for theoretical analysis to determine the PSF. Alternately, computer software designed to perform optical ray tracing may be employed for the required calculations. TracePro by Lambda Research Corporation of Littleton, Mass. and LightTools by Optical Research Associates of Pasadena, Calif. are two examples of such computer software. Such calculations, however, because they are based on the design of the system and not on its physical embodiment, may not account for all relevant physical effects. This approach requires a high level of specialized skill to perform the needed calculations.

Also, in any given system, the PSF may be determined directly. Experimentally in principle, introducing a highly localized source of optical flux as an object, a so-called point-source object, produces the PSF directly in output image plane. Because only a small fraction of the incident flux is typically misdirected to any particular undesired location in the image plane, an intense flux source must be employed. The intense source, in turn, typically causes image-plane detector saturation, thereby directly preventing PSF measurement in the region of saturation. This saturation may also interfere with proper signal processing, and thus prevent or greatly complicate determination of the PSF from the measured signal values.

Signal processing may be employed to indirectly determine the PSF of a given system. The imaging performance of both spectrometers and optical imaging systems has long been characterized by employing the concept of a PSF. Traditionally, this PSF has incorporated mainly contributions from aperture diffraction, optical aberrations, and possibly defocus blur. This traditional PSF is relatively compact and localized compared with the PSF associated with stray flux and, unlike the stray-flux PSF, has long been a mainstay of optical system design and analysis. In both spectroscopy and optical imaging, traditional PSF's have been successfully determined by introducing a known object, sometimes a flux source that is not highly localized. PSF determination by these means requires removal of broadening and other effects introduced by the objects extended (not point-like) nature. More specifically, because these objects are extended, the acquired image data contain contributions from both the PSF and the object. The acquired data need to be processed to remove the object contribution, thereby leaving only the PSF.

For an optical system exhibiting a shift-invariant imaging characteristic, objects exhibiting a straight discrete boundary or edge may be used to determine the transfer function of the optical system as described in Tatian, B. (1965). "Method for Obtaining the Transfer Function From the Edge Response Function," J. Opt. Soc. Am. 55, 1014-1019. The PSF is easily obtained from this function by computing its Fourier transform. A discussion of the relationships between edge- and line-spread and point-spread functions, and mathematical expressions relevant to PSF determination via these means is provided in "Radiologic Imaging," 2-Vol. Ed., V. 1, Barrett, H. H. and Swindell, W., pp. 59-61. Academic Press, New York, 1981. In thus determining a PSF, it is helpful if the PSF is shift-invariant and rotationally symmetric.

If the PSF is not symmetric or has a lower order of symmetry, or if the PSF is shift variant, methods employing edge and line response become more complicated and may not be able to accurately characterize the PSF. Furthermore, because a shift-variant PSF exhibits more degrees of freedom than a shift-invariant one, more data is required for an accurate determination. Stable inversion of a shift-variant imaging equation to obtain the shift-variant PSF may not be possible based merely on the characteristics of the known object plus limited data available.

SUMMARY OF THE INVENTION

The present disclosure comprises one or more of the features recited in the appended claims and/or the following features which, alone or in any combination, may comprise patentable subject matter:

According to the present disclosure, a method and apparatus to determine the stray-light point-spread function (PSF) of an optical imaging system such as a digital camera is disclosed. The apparatus may comprise a source of luminous flux delimited by a discrete boundary having known shape. The data acquisition apparatus may be designed to present edges in various orientations and in various positions in the object field to provide the most complete PSF information in various directions and field positions. Images of the object are acquired to serve as data for the PSF determination process to be described in more detail below. If the flux source is local in nature, multiple images of the source may be acquired in the various positions needed to obtain the required data. In order to determine the PSF parameter values, an object may be imaged comprising, illustratively, a nominally circular shape emitting luminous flux at various positions in the field that was imaged by the camera.

To characterize the PSF, images of the flux source object are captured when it is located at several locations in the field of view of the camera. At a given location, images may be captured at two different shutter speed settings. These two images may be combined to get both a less noisy image in the dark part of the image and preserve details in the highlights. The raw image data may be first calibrated and then the image may be thresholded at half of the maximum digital intensity to separate object pixels and background pixels. A value of 1 may be assigned to the object pixels and a value of 0 may be assigned to the background pixels. Intermediate values between 0 and 1 may be assigned to the pixels in the background that are neighbors to object pixels to compensate the errors because of the partial illumination of some pixels. This assignment may be made by convolving the image with a 3-by-3 averaging filter. This filtered image may be defined as the ideal image.

The PSF may be established by a functional form model. The functional form model may include the effects of stray light. In some embodiments, the functional form model may include the effects of diffraction and aberration. The functional form model may include the effects of shading within the optical system. The functional form model for the effects of stray light may be shift-variant. The functional form model for the effects of stray light may be rotationally invariant. The functional form model may have relatively few parameters. In some embodiments, the functional form model may have less than five parameters.

The parameters of the PSF may be estimated by minimizing a cost function. The cost function may include a stray light portion and an error portion attributed to aberration, diffraction and other similar effects. The cost function may consider shading. The parameters of the PSF may be estimated to arrive at a metric for correction of image data captured by the imaging system.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE FIGURES

The detailed description particularly refers to the accompanying figures in which:

FIG. 9-17 are diagrammatic representations of the position of the aperture of the light source box relative to the field of view of the camera;

DETAILED DESCRIPTION

According to the present disclosure, a method and apparatus to determine the stray-light PSF of an optical imaging system such as a digital camera, for example, is disclosed. Though it is described in the context of determining the shift-variant PSF of a such a camera, it is to be understood that the method disclosed may readily be extended to characterization of shift-invariant PSF's, more traditional PSF's not characteristic of stray light, and PSF's associated with other imaging modalities as those mentioned in the foregoing.

Figure 1:
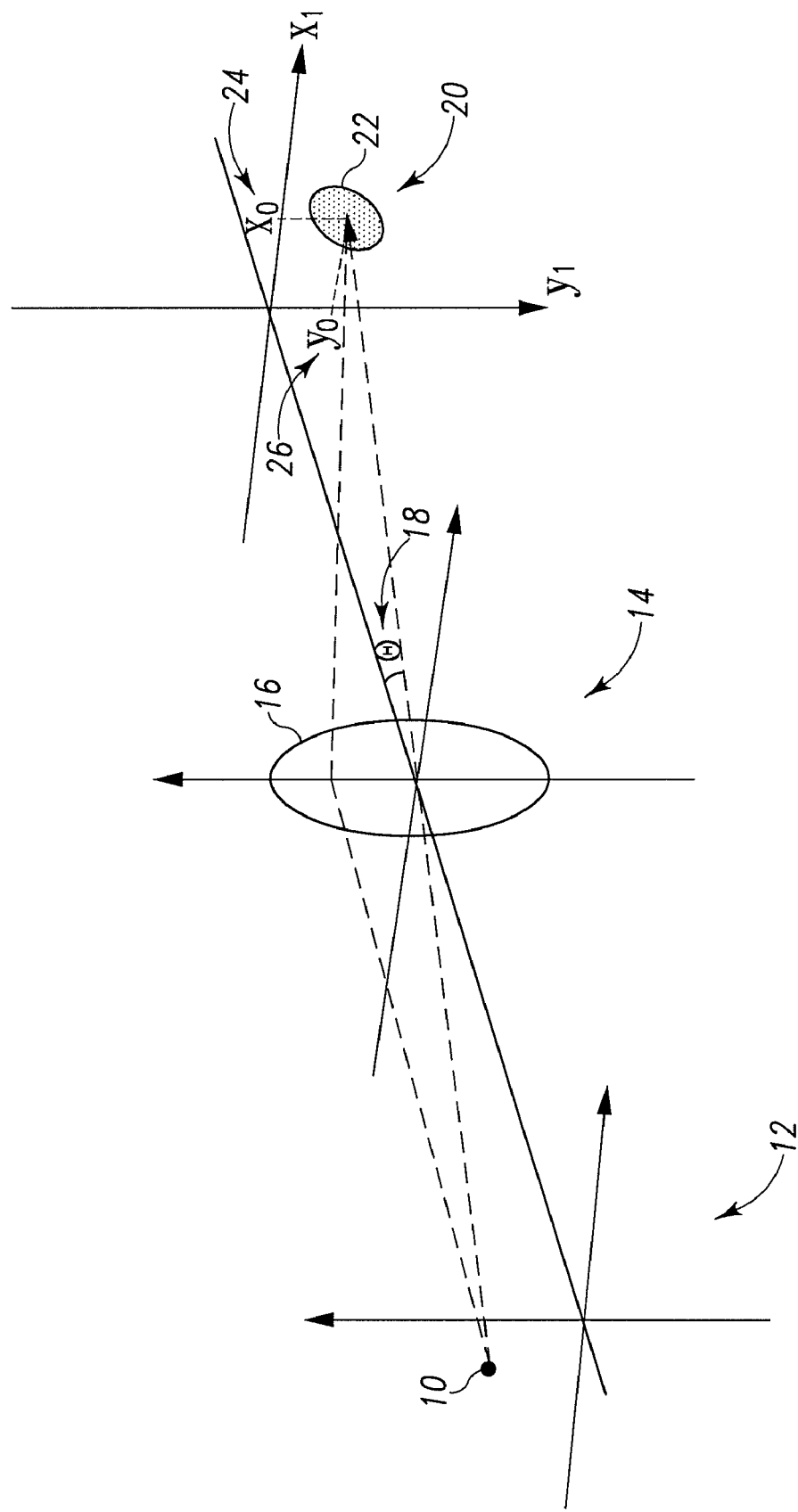
FIG. 1 is a diagrammatic representation of an image-plane coordinate system depicting the point-spread function of a point source from an object plane on an image plane of a an optical system.

In an image plane coordinate system such as the illustrative coordinate system shown in FIG. 1, an object plane 12 is detected by an imaging system 14 and is transferred to an image plane 20. In any given imagining system, the image plane 20 and the object plane 12 share a common axis. The object plane 10 includes an infinite number of ideal point sources 10 of image flux. In the illustrative diagram of FIG. 1, a single point source 10 is transferred through lens 16 and is distributed on the image plane 20 as illustrated by the point-spread function (PSF) 22. The position of the center of the PSF 22 is defined by the distance between the object plane 12 and imaging system 14 as well as the distance between the lens 16 and the image plane 20.

Figure 19:
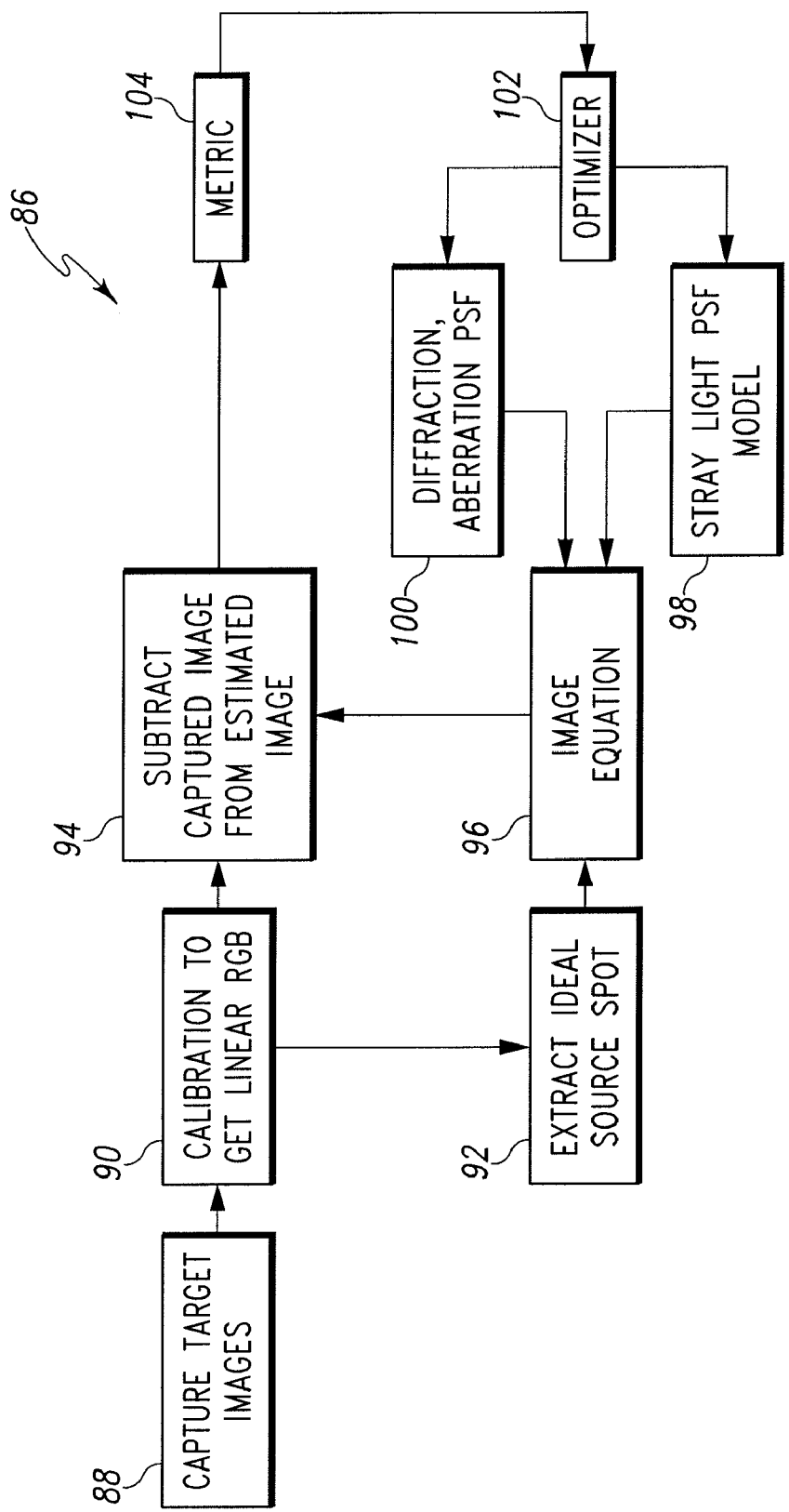
FIG. 19 is a process diagram for a process of estimating a full point-spread function from sample data according to the present disclosure.

The PSF 22 depicts the scatter of the point source 10 as a result of diffraction and aberration through lens 16 as well as stray flux effects. The imperfections of the imaging system 14 result in a PSF 22 as opposed to a perfectly detected point located at $x_0$, $y_0$, which would be the ideal image of the point source 10. Characterization of the image system 14 allows for adjustment of the detected PSF 22 to approximate the ideal image. The present disclosure includes a process 86, shown diagrammatically in FIG. 19, to characterize the PSF 22 or multiple PSF's 22, for a given imaging system 14 such that the imaging system 14 can automatically compensate for the stray flux effects and thereby improve the image quality to approximate the ideal image.

Figure 2:
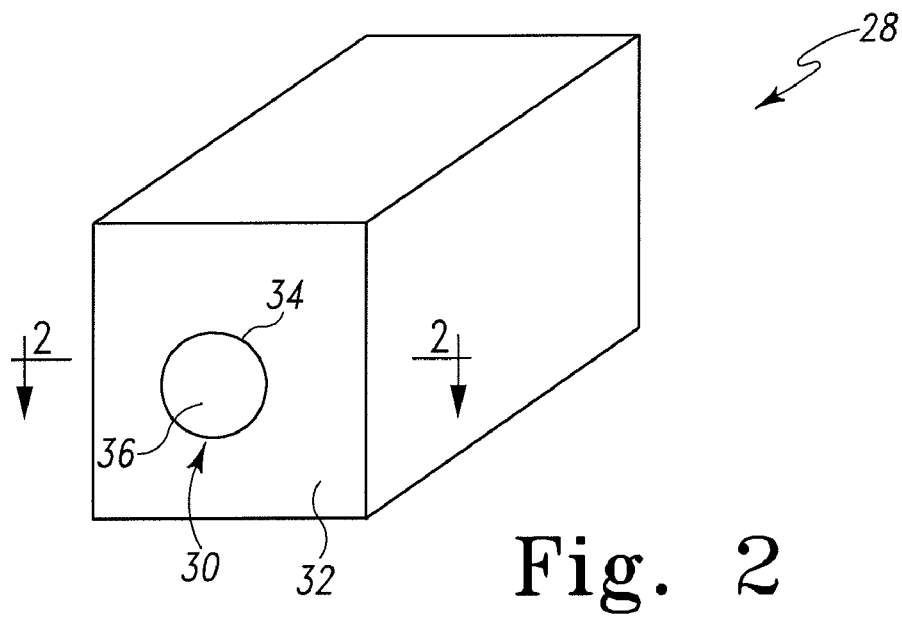
FIG. 2 is an isometric view of a light source box configured to provide nearly uniform illumination over an aperture.
Figure 3:
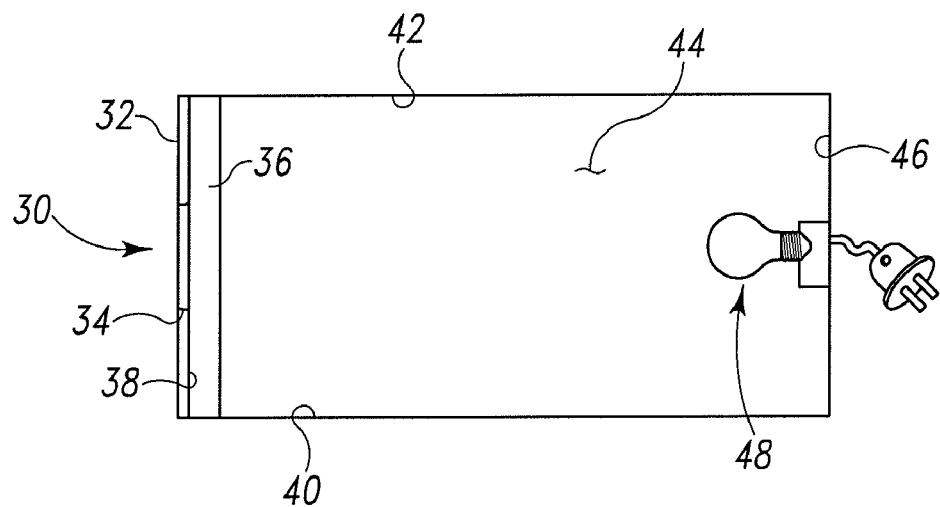
FIG. 3 is a cross-sectional view of the light source box of FIG. 2.

The first step 88 of the process 86 is to capture target images from which the characteristics of the PSF 22 can be approximated. In the illustrative embodiment, an idealized image source 28 includes a light source 48, illustratively a 75 W photo light bulb part number GE PH211 from General Electric Company, Fairfield, Conn. and an source spot 30. Source spot 30 is bounded by a circular cut-out 34 formed in a cardboard wall 32 as seen in FIGS. 2 and 3. Light source 48 is positioned within image source 28 which is an enclosure with six walls. The interior side 38 of cardboard wall 32 is black. The remaining interior walls 40, 42, 44, 46 and a top wall (not shown) are each white to reflect as much of the flux from light source 48 as possible. An acrylic diffuser 36 is positioned within image source 28 adjacent to cardboard wall 32 and acts to diffuse the flux from light source 48 to provide a generally constant source of flux external to the image source 28. In the illustrative embodiment, the diffuser is a 0.25 in. white acrylic material. In this configuration, source spot 30 distributes the flux from light source 48 in an approximately idealized manner. Illustratively, the source spot 30 was a 4 in. circle and was shown to have a deviation of less than 2% from the maximum luminance in the illustrative embodiment. The luminance was tested with a part number PR705 spectroradiometer from Photo Research, Inc. of Chatsworth, Calif. While the source spot 30 of the illustrative embodiment is circular, it should be understood that any of a number of aperture 34 shapes and sizes may be chosen.

Figure 4:
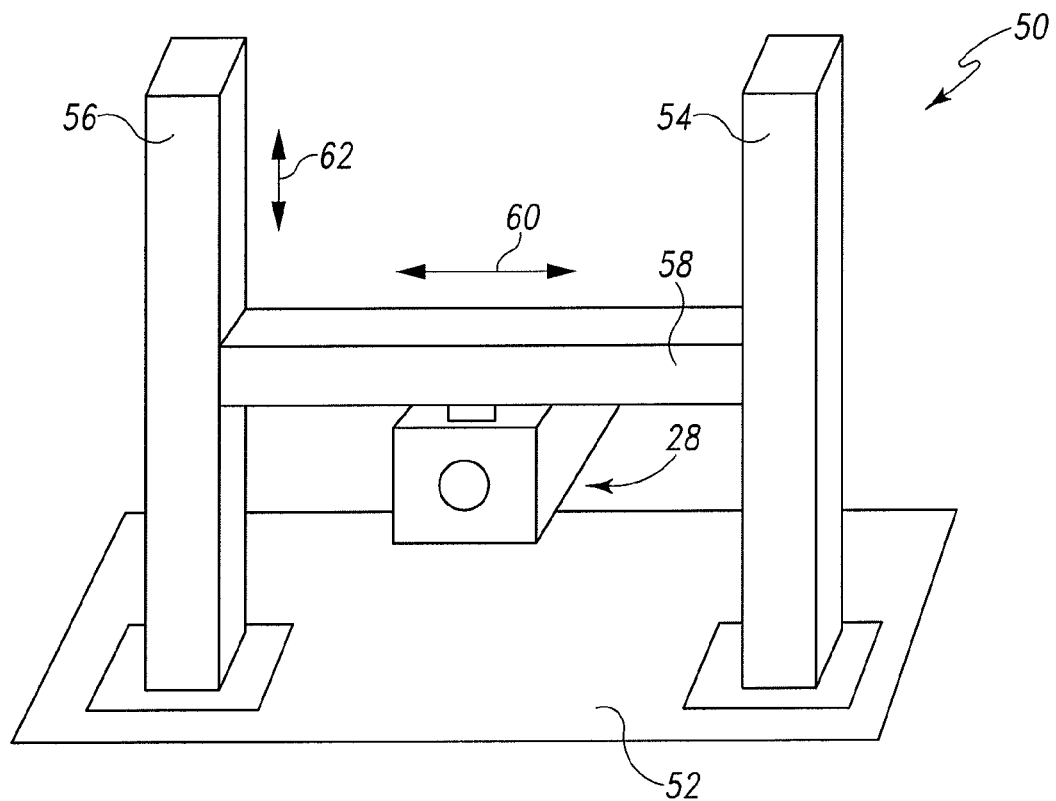
FIG. 4 is an isometric view of an optical rail system configured to move the light source box of FIGS. 2 and 3 over a field of view of a camera.
Figure 5:
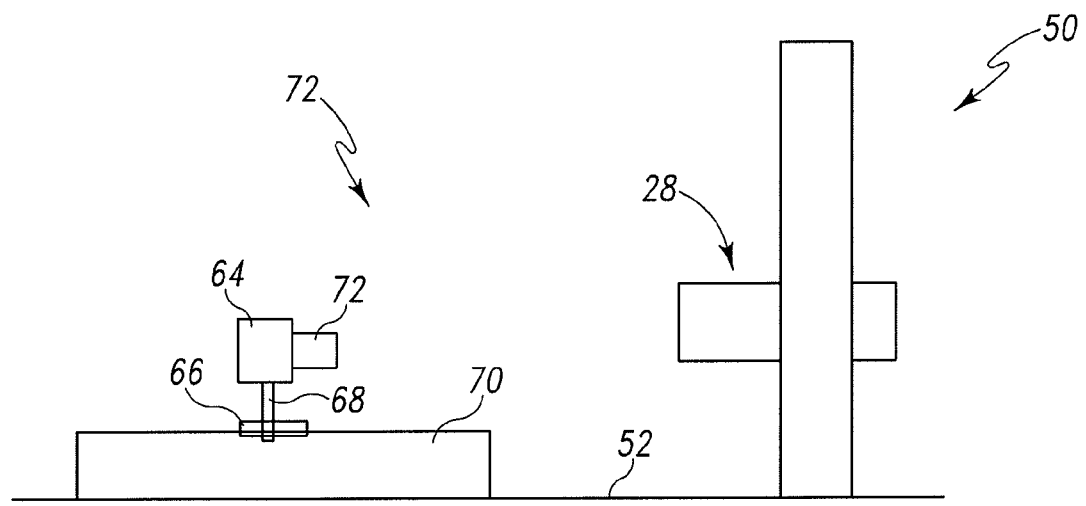
FIG. 5 is a side view of an experimental set-up of a camera positioned on a support carrier movable to change the distance between the camera and the optical rail system of FIG. 4.

In order to vary the position of the source spot 30 in the field of view of the imaging system, the image source 28 was mounted on an optical rail system 50 as shown in FIG. 4. The image source 28 is coupled to a horizontal rail 58 on which the source can move as depicted by the arrow 60. The horizontal rail 58 is supported on two vertical rails 54 and 56 respectively such that the horizontal rail 58 and thereby the image source 28 are movable vertically as depicted by arrow 62. Vertical rails 54 and 56 are supported on a pair of base plates 51. Illustratively, the horizontal rail 58 is a part number CXL95-80, the vertical rails 54 and 56 are part number X95-1 and the base plates 51 are part number M-PBN16, all available from Newport Corporation of Irvine, Calif.

Figure 6:
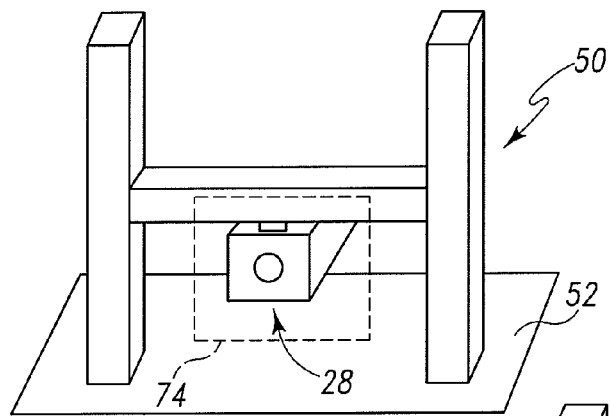
FIGS. 6-8 are isometric views of the optical rail system and light source box of FIGS. 2-5 in various positions relative to the field of view of a camera, the field of view shown in phantom.
Figure 7:
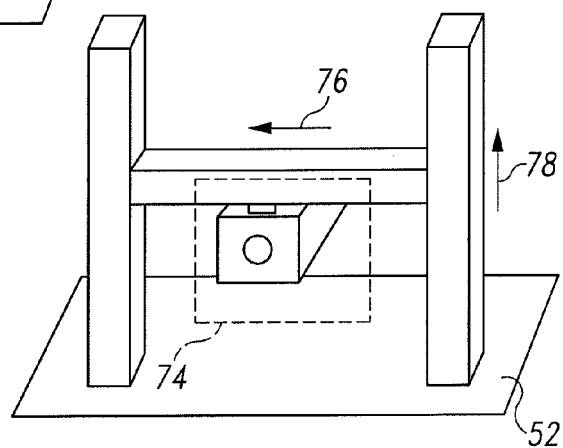
Figure 8:
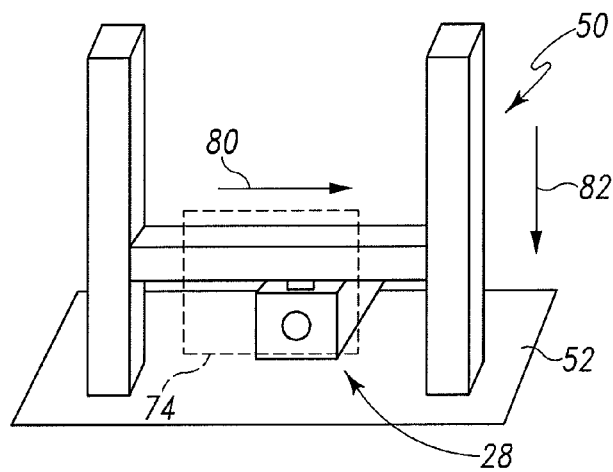

A camera 64 including a lens 72 is positioned on rail 70 (part number CXL95-80 from Newport Corporation of Irvine, Calif.). Rail system 50 and rail 70 are mounted on a common base 52. Camera 64 is supported on a support 68 mounted to a rail carrier 66 such that camera 64 is movable relative to rail 70 as depicted by arrow 106 to change the distance between camera 64 and light source 28. Illustratively, camera 64 is a Canon Digital Rebel 300D from Canon U.S.A. of New York, N.Y. The field 74 of camera 64 is depicted in phantom in FIGS. 6-8. In FIG. 6, light source 28 is in a first position and image data is captured in that position, which is a known position. As shown in FIG. 7, light source 28 is moved to a second position relative to the field 74 of camera 64 as depicted by arrows 76 and 78. Additional image data is captured in the second position. FIG. 8 illustrates still a third position of light source 28 relative to field 74 where light source is moved in the direction of arrows 80 and 82 such that still additional image data may be captured.

Figure 18:
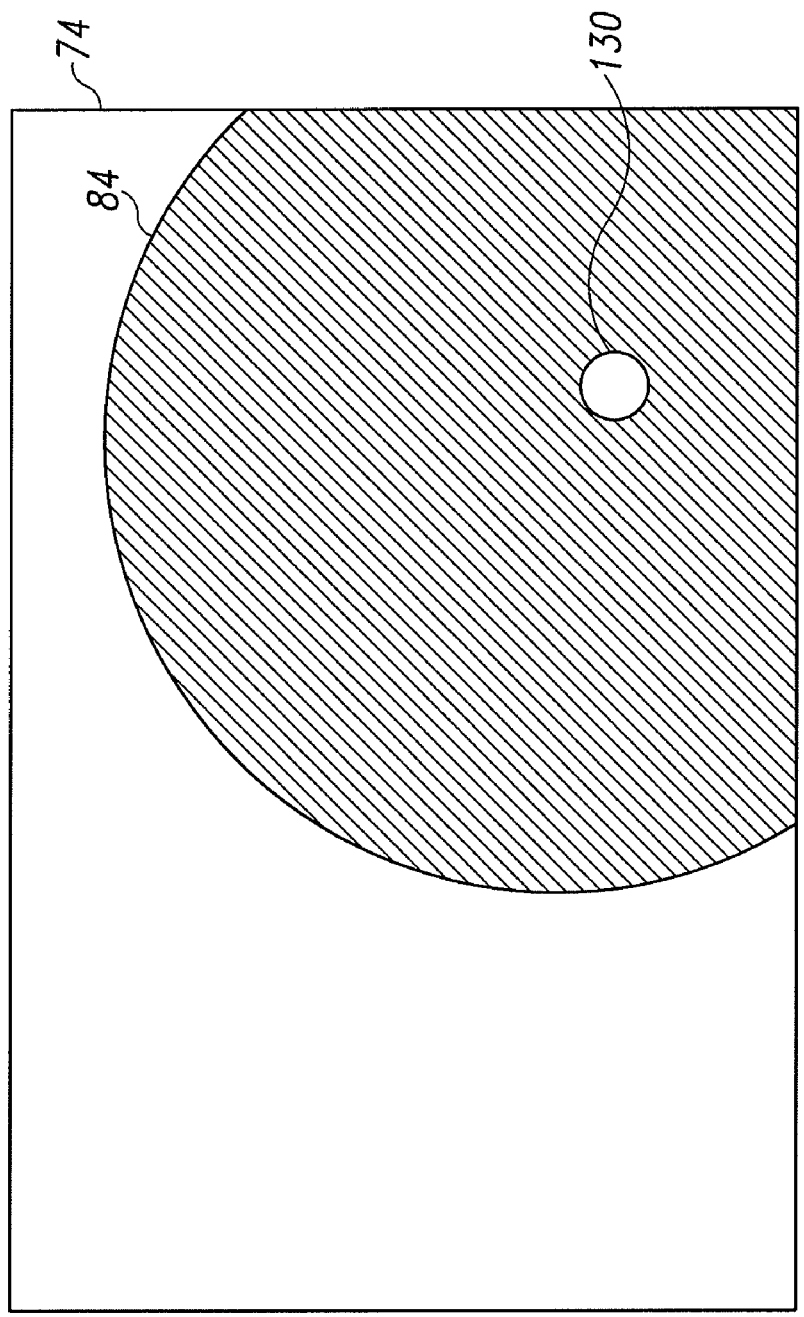
FIG. 18 is a diagrammatic representation of the number of pixels selected in a cost function as the pixel is related to an object.

Illustratively, an image 130 (seen in FIG. 18) of source spot 30 is captured in 9 different positions as depicted by FIGS. 9-17. In FIG. 9, source spot 30 is positioned at a generalized position $x_i$, $y_i$. Additional positions $x_j$, $y_j$ through $x_q$, $y_q$ are depicted in FIGS. 10-17. While in the illustrative embodiment source spot 30 was captured in 9 positions, it should be understood that the sample size may be varied as necessary to gather sufficient data to characterize the PSF 22. In each position, source spot 30 was captured as an image 130 at two different shutter speed settings. A normal exposure is captured with an aperture setting of f/8 for 1/40th of a second. This setting results in noise in the dark part of the captured image 130. An overexposed image is then captured with an aperture setting of f/8 for 2 seconds. The presence of stray flux increases in proportion to shutter speed, but noise remains relatively constant. Summing of the two captured images reduces the noise in the dark part of the captured image 130 but preserves details in the highlights of the captured image 130.

The captured images 130 captured from source spot 30 present edges in various orientations and in various positions in the field 74 to provide extensive PSF information in various directions and field 74 positions. This permits characterization of the most general shift-variant PSF to thereby characterize PSF 22. The solution of Equation (1) may by determined by numerical methods and then inverted to establish the PSF 22. In the shift-invariant PSF case, the process of deconvolution may be applied as described by Jansson in "Deconvolution of Images and Spectra," Academic Press, New York, (1997). The more general shift-variant problem may also be solved by methods described in many of the references cited therein.

The present case of PSF determination may be ill-posed (e.g. having multiple solutions) if additional PSF prior knowledge is not employed. This is especially true in the shift variant case. Assumption of a functional form for the PSF 22 allows determination of the function's parameters by using an optimization method to fit the function to the data. An illustrative approach for optimization is presented in "Numerical Recipes in FORTRAN, the Art of Scientific Computing," Cambridge University Press, New York, (1992). As an alternative approach, iterative solution of the most general PSF with smoothing between iterations to control the appearance of artifacts may be employed to characterize PSF 22.

In the case of a digital camera, such as camera 64, the functional form should be capable of approximating PSF's affected by the sources of stray flux noted in the foregoing, but especially stray flux owing to scattering phenomena. It should also be rotationally invariant because, except for the detection components, digital camera components that interact with entering luminous flux are typically symmetric about the lens optical axis. Such components typically include lens elements, stops, filters and mounting hardware. By rotational invariance, it is meant that the PSF functional form will be unchanged by any coordinate transformation corresponding to a coordinate rotation about the lens' optical axis.

The bidirectional radiance distribution function (BRDF) resulting from various scattering phenomena is approximated by a function of the form of Equation (2):

$$\text{BRDF} = b/100(\sin\theta_i - \sin\theta_o)]^m, \quad (2)$$

where b and m are empirical constants, and $\theta_i$ and $\theta_o$ are the incident and output angles respectively. See, for example, Bely, P. Y. et al., "Straylight Analysis of the Yardstick Mission," NGST Monograph No. 2, Next Generation Space Telescope Project Study Office, Goddard Spaceflight Center, Greenbelt, Md., (1999). The quantity m is typically negative. For small a difference between incidence and output angles typical of ray incidence on various lens surfaces, a point-source object could be expected to produce a flux distribution, hence PSF, in the image plane whose dependence goes as $q(\theta_i-\theta_o)^p$, where q and p are positive constants that may be determined empirically. The empirical PSF approximation thus obtained, however, fails at the origin, where it exhibits a singularity. Its form requires modification to eliminate this behavior. A simple modification of its form for the case in which p is assumed to be unity has been as disclosed in Jansson, P. A., and Breault, R. P. (1998). "Correcting Color-Measurement Error Caused by Stray Light in Image Scanners," The Sixth Color Imaging Conference: Color Science, Systems, and Applications, Nov. 17-20, 1998, Scottsdale, Ariz., pp. 69-73.

In addition to the previously discussed single scattering events of each incident ray, digital camera PSF's must accommodate the possibility of multiple scattering, as well as contributions from other phenomena such as Fresnel reflections. When multiple sources of spreading are present, the resulting distribution function is typically given as the convolution of the distribution functions of the individual sources. Depending on the nature of the individual distributions, application of the central-limit theorem from probability and statistics for one independent variable reveals the resulting distribution typically to have the form of a Gaussian distribution, $$s_G(x) = \exp(-x^2) \quad (3)$$

or a Cauchy distribution, $$s_L(x) = \frac{1}{1+x^2}. \quad (4)$$

According to the present disclosure, the expressions for these distributions are assigned an arbitrarily simple scaling for both the independent variable x, and for the functions $s_G$ and $s_L$.

In the illustrative embodiment, a shift-variant, rotationally invariant two-dimensional PSF functional form was developed. A PSF functional form with various choices of parameters and taken in various appropriate limits approximates a 2-D Gauss function, a 2-D Cauchy function, a combination of the two such as a Voigt function, or a hyperbola. The selected functional form does not fail numerically at the origin. A consideration in choosing the functional form is that, the resulting PSF should exhibit smooth behavior over the entire field of the camera and have an elliptical, or approximately elliptical, cross section when arbitrary slices of it are taken parallel to its independent-variable (coordinate) plane. Considering the symmetry of the illustrative camera 64, the ellipse widths should be equal for flux sources located on the optical axis, thereby yielding circular PSF cross sections when it is so located, and an elliptical, or approximately elliptical, cross section elsewhere.

A PSF functional form meeting these criteria is given by $$s_C(x_0, y_0, x_1, y_1; a, b, f, g) = \frac{K_1}{\left(\frac{1}{x_0^2+y_0^2}\left(\frac{(x_1 x_0 + y_1 y_0 - x_0^2 - y_0^2)^2}{(a(x_0^2+y_0^2)+g)^2} + \frac{(-x_1 y_0 + y_1 x_0)^2}{(b(x_0^2+y_0^2)+g)^2}\right)+1\right)^f} \quad (5)$$

in which definition $s_C$ is the shift-variant PSF meeting the desired criteria, $x_0$ and $y_0$ are the image-plane coordinates of a small area element originating stray flux, and $x_1$ and $y_1$ are the image-plane coordinates of a small area element affected by that stray flux. The quantities a, b, d, f, and g are the parameters of the PSF model and may be identified as follows. The quantity d is proportional to the magnitude of the stray flux transported between the area elements, a and b govern the rate of change of the respective elliptical cross section widths with respect to the distance from the optical axis center, and g governs the circular diameter of the PSF when it is centered at the optical axis and f controls the rate of decrease. In addition, $K_1$ is a normalizing constant which makes the summation over $x_1 y_1$ equal to 1. Equation (5) is a single illustrative embodiment. It should be understood by those skilled in the art that it is possible to employ other functions meeting these criteria or some subset thereof.

The images 130 of source spot 30 are taken in a manner to assure the spatial uniformity of the emitted flux. After the capture of images 130 at step 88 of the process 86, the images are calibrated at step 90. Calibration is accomplished using known calibration parameters as described in Sharma, G, "Digital Color Imaging Handbook," First Ed., pp. 269-385, (2003).

Jansson and Breault have shown that the character of point-spread functions, such as s (x, y; x', y'), necessarily varies with the wavelength of light. Therefore both the imaging-system description and consequent stray-light correction methods need to consider this variation for color image correction. The present method, in order to simplify both camera description and image correction, considers the CIE standard-observer $\bar{x}$, $\bar{y}$, $\bar{z}$ functions as each describing separate monochromatic responses with wavelengths corresponding to the peaks of these functions, respectively. (see Judd, D. B., and Wyszecki, G., "Color in Business, Science and Industry," Third Ed., p. 125, (1975).) Following the same reasoning strictly, the $\bar{x}$ function would require summing responses at the two wavelengths that correspond to its two peaks. However, color cameras typically employ three so-called RGB detectors, each having a single-peak wavelength response. For clarity, notations showing wavelength dependencies are suppressed throughout the present disclosure. It should be understood that required computations can be replicated at numerous multiple wavelengths for accuracy, or at detector/receptor response peaks as a practical approximation. In some embodiments, multiple PSF's, one for each detector spectral peak, for each combination of camera settings may be determined. Similarly, it should be understood that a number of PSF's, may be determined at various aperture diameter settings and zoom levels to characterize camera 64 over the entire performance range of camera 64 and the methods described herein may be extended over any of a number of camera settings.

In the illustrative embodiment, idealized versions of images 130, devoid of stray flux and other broadening effects describable by convolution with a PSF, are determined by thresholding the images 130 at step 92. The image 130 is thresholded at half the maximum digital intensity to separate object pixels and background pixels. Object image pixels are assigned a value of 1 and background pixels are assigned a value of 0. Intermediate values between 0 and 1 are assigned to background pixels neighboring object pixels to compensate for partial illumination. Assignment of intermediate values is accomplished by convolving the image 130 with a 3-by-3 averaging filter to extract the ideal image.

The ideal image PSF of Equation (5) considers stray light effects. However, additional characterization is necessary to account for other contributions including diffraction and aberration. In the illustrative embodiment, a model for the $S_G$ component is a 2D Gaussian function in Equation (6):

$$s_G(x_0, y_0, x_1, y_1; \sigma) = \frac{K_2}{\sigma^2} \exp\left(-\frac{(x_1-x_0)^2 + (y_1-y_0)^2}{2\sigma^2}\right) \quad (6)$$

where $\sigma$ is the width of the Gaussian kernel and $K_2$ is a normalizing constant for this PSF. Therefore, the total normalized PSF $s_N$ described by a weighted sum of the two parts is as follows:

$$s_N(x_0,y_0,x_1,y_1;a,b,f,g,\sigma,\beta) = (1-\beta)s_G(x_0,y_0,x_1,y_1;\sigma) + \beta s_C(x_0,y_0,x_1,y_1;a,b,f,g) \quad (7)$$

where $\beta$ denotes the proportion of stray flux and where $\beta$ is a real number between 0 and 1. This is a normalized model. Inherent in each simple optical imaging system, illumination falls off toward the periphery of the image according to the $\cos^4 \theta$ law as described in Ray, S. F., "Applied Photographic Optics," pp. 131-133 Focal Press, Woburn, Mass., (2002). This phenomenon is called shading. To completely model the PSF 22, a multiplicative term that accounts for shading effect is included in the model. While the illustrative embodiment employs the $\cos^4 \theta$, it should be understood that any of number of functional forms may be chosen to account for shading effects in the imaging system. According to the illustrative form, denoting the distance from the exit pupil to the image plane as D, the shading associated with point $(x_0, y_0)$ is:

$$\cos(\theta) = \frac{D}{\sqrt{x_0^2 + y_0^2 + D^2}} \quad (8)$$

So the PSF at point $(x_0, y_0)$ is reformulated in Equation (9).

$$s(x_0, y_0, x_1, y_1; a, b, f, g, \sigma, \beta, D) = \frac{D^4}{(x_0^2 + y_0^2 + D^2)^2} s_N(x_0, y_0, x_1, y_1; a, b, f, g, \sigma, \beta) \quad (9)$$

This is a complete forward model formulation having seven unknown parameters, namely (a, b, f, g, $\sigma$, $\beta$, D). To remove stray-light from the captured image, the parameters are estimated and the model is inverted to complete the ideal image equation at step 96.

Estimation of PSF 22 parameters is through minimizing a cost function which characterizes the difference between captured images 130 and images estimated by the assumption of the proposed PSF. The cost function is defined as shown in Equation (10).

$$\varepsilon = \sum_{j=1}^{n} \sum_{(x,y) \in I_j} (\hat{i}_j(x, y) - i_j(x, y))^2 \quad (10)$$

$$= \sum_{j=1}^{n} \sum_{(x,y) \in I_j} \left( \left( \sum_{x_0} \sum_{y_0} o_j(x_0, y_0) s(x_0, y_0, x, y; \hat{a}, \hat{b}, \hat{f}, \hat{g}, \hat{\sigma}, \hat{\beta}, \hat{D}) \right) - i_j(x, y) \right)^2$$

In the equation above, n is the number of images used for estimation, $\hat{i}_j(x,y)$ is the jth estimated image, $i_j(x,y)$ is the jth captured image, $o_j(x,y)$ is the jth ideal image, $\hat{a}, \hat{b}, \hat{f}, \hat{g}, \hat{\sigma}, \hat{\beta}, \hat{D}$ are the estimates of parameters, $I_j$ is the jth set of pixels where the squared error is computed. The final estimates of parameters are defined as follows:

$$(a^*, b^*, f^*, g^*, \sigma^*, \beta^*, D^*) = \underset{(\hat{a},\hat{b},\hat{f},\hat{g},\hat{\sigma},\hat{\beta},\hat{D})}{\arg\min} \varepsilon \quad (11)$$

Not all pixels in the image are used to compute the cost function since many pixels are noise pixels and lack any useful information. To establish a region of interest 84 shown in FIG. 18, the mean of a set of pixels far from the targeted area of the image 130 plus three times their standard deviation is used to establish a boundary for the region of interest. Additionally, only a few pixels within the target image 130 to account for shading are selected. Pixels outside the target image 130 but within the region of interest are used to account for shading. These pixels compose the set of selected pixels as denoted by $I_j$ in Equation (10).

Figure 20:
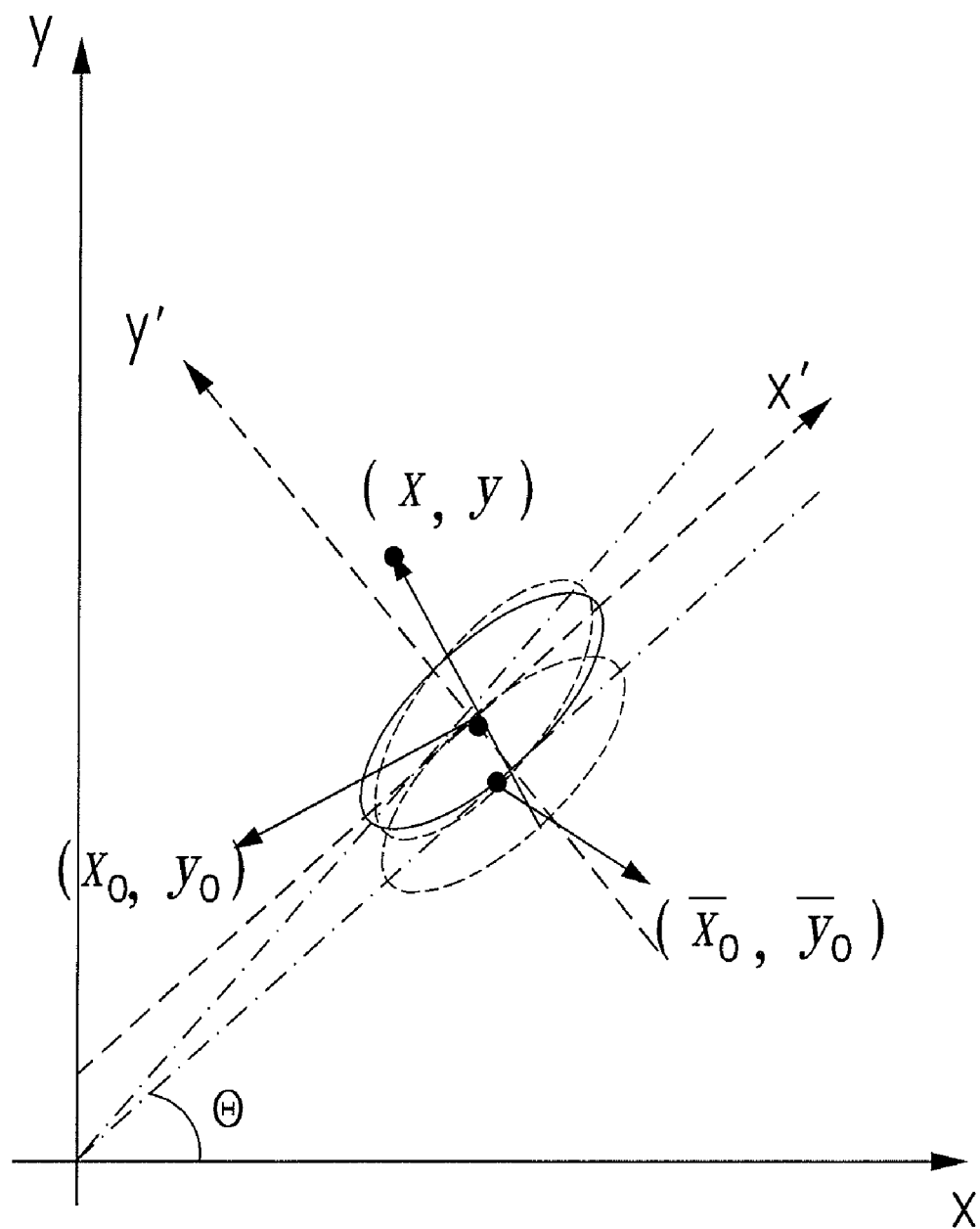
FIG. 20 is a diagrammatic representation of an estimation of a point-spread function.

Because the PSF is shift variant, directly computing the cost using Equation (10) is inefficient and an approximation is applied to make the computation. In the illustrative embodiment, it is assumed that the stray-light PSF sC within the target region is shift invariant and is equal to the PSF at the center of the target region. Since the target is relatively small compared to the size of the image, this is a good approximation. The approximation is illustrated in FIG. 20. At point (x0, y0), instead of using the PSF indicated by the solid ellipse, the PSF depicted by the dashed ellipse, which is the exact copy of the PSF at point $(\bar{x}_0, \bar{y}_0)$ is used. Once the PSFs at the target region are the same, a fast Fourier transform (FFT) is used to compute the superposition as convolution.

This superposition is turned into convolution with some shift invariant kernel. By simplifying notation, i.e. dropping the subscript j from the symbols and removing the hat signs, the superposition is expressed in Equation (12):

$$i(x, y) = \sum_{(x_0, y_0)} s(x, y, x_0, y_0; a, b, f, g, \sigma, \beta, D) o(x_0, y_0) \quad (12)$$

$$= \sum_{(x_0, y_0)} \frac{D^4}{(x^2 + y_0^2 + D^2)^2} ((1-\beta) s_G(x_0, y_0, x, y; \sigma) +$$

$$\beta s_C(x_0, y_0, x, y; a, b, f, g)) o(x_0, y_0)$$

$$= \sum_{(x_0, y_0)} \left( \frac{(1-\beta) K_2}{\sigma^2} \exp\left(-\frac{(x-x_0)^2 + (y-y_0)^2}{2\sigma^2}\right) \right) o(x_0, y_0)$$

$$\frac{D^4}{(x_0^2 + y_0^2 + D^2)^2} +$$

$$\frac{\beta K_1}{\left(\frac{1}{x_0^2 + y_0^2}\left(\frac{(xx_0 + yy_0 - x_0^2 - y_0^2)^2}{(a(x_0^2 + y_0^2) + g)^2} + \frac{(-xy_0 + yx_0)^2}{(b(x_0^2 + y_0^2) + g)^2}\right) + 1\right)^f} \cdot \frac{o(x_0, y_0) D^4}{(x_0^2 + y_0^2 + D^2)^2}$$

$$= \sum_{(x_0, y_0)} \left( \frac{(1-\beta) K_2}{\sigma^2} \exp\left(-\frac{(x-x_0)^2 + (y-y_0)^2}{2\sigma^2}\right) o(x_0, y_0) \right.$$

$$\frac{D^4}{(x_0^2 + y_0^2 + D^2)^2} +$$

$$\frac{\beta K_1}{\left(\frac{\left(\frac{((x-x_0)x_0 + (y-y_0)y_0)^2}{(a(x_0^2 + y_0^2) + g)^2} + \frac{(-(x-x_0)y_0 + (y-y_0)x_0)^2}{(b(x_0^2 + y_0^2) + g)^2}\right)}{x_0^2 + y_0^2} + 1\right)^f} \cdot \frac{o(x_0, y_0) D^4}{(x_0^2 + y_0^2 + D^2)^2}$$

In Equation (12), the first term in the summation is already in the form of convolution. Equation (12) can be simplified as in Equation (13). Note that in Equation (13) $(\bar{x}_0, \bar{y}_0)$ denotes the center of a particular target region, $\tilde{s}_G(x,y)$ is the convolution kernel of the Gaussian part, $\tilde{s}_G(x,y) = s_G(x_0, y_0, x_0+x, y_0+y; \sigma)$, $\tilde{s}_{C,(\bar{x}_0,\bar{y}_0)}(x,y)$ is the convolution kernel of the stray part for this region, $\tilde{s}_{C,(\bar{x}_0,\bar{y}_0)}(x,y) = s_C(\bar{x}_0, \bar{y}_0, \bar{x}_0+x, \bar{y}_0+y; a,b,f,g)$. In addition, it is also straightforward to see that $\tilde{s}_{C,(\bar{x}_0,\bar{y}_0)}(x-x_0, y-y_0)$ is the stray-light PSF at the center point $(\bar{x}_0, \bar{y}_0)$. Parameters from all 9 positions are estimated such that the result of estimated PSF can capture the spatial variance of stray light contamination.

$$i(x, y) \approx \sum_{(x_0, y_0) \in R} \left( \frac{(1-\beta) K_2}{\sigma^2} \exp\left(-\frac{(x-x_0)^2 + (y-y_0)^2}{2\sigma^2}\right) \right. \quad (13)$$

$$o(x_0, y_0) \frac{D^4}{(x_0^2 + y_0^2 + D^2)^2} +$$

$$\frac{\beta K_1}{\left(\frac{\left(\frac{((x-x_0)\bar{x}_0 + (y-y_0)\bar{y}_0)^2}{(a(\bar{x}_0^2 + \bar{y}_0^2) + g)^2} + \frac{(-(x-x_0)\bar{y}_0 + (y-y_0)\bar{x}_0)^2}{(b(\bar{x}_0^2 + \bar{y}_0^2) + g)^2}\right)}{\bar{x}_0^2 + \bar{y}_0^2} + 1\right)^f}$$

$$\left. \frac{o(x_0, y_0) D^4}{(x_0^2 + y_0^2 + D^2)^2} \right)$$

$$= (1-\beta) \tilde{s}_G(x, y)  \tilde{o}(x, y) + \beta \tilde{s}_{C,(\bar{x}_0,\bar{y}_0)}(x, y)  \tilde{o}(x, y)$$

where $$\tilde{s}_G(x, y) = \frac{K_2}{\sigma^2} \exp\left(-\frac{x^2 + y^2}{2\sigma^2}\right)$$

-continued $$\tilde{s}_{C,(\bar{x}_0,\bar{y}_0)}(x, y) = \frac{K_1}{\left(\frac{\frac{(x\bar{x}_0 + y\bar{y}_0)^2}{(a(\bar{x}_0^2 + \bar{y}_0^2) + g)^2} + \frac{(-x\bar{y}_0 + y\bar{x}_0)^2}{(b(\bar{x}_0^2 + \bar{y}_0^2) + g)^2}}{\bar{x}_0^2 + \bar{y}_0^2} + 1\right)^f}$$

$$\tilde{o}(x, y) = o(x, y)\frac{D^4}{(x^2 + y^2 + D^2)^2}$$

To minimize error, an optimization algorithm 102 is applied. Utilizing a subspace trust region method based on the interior-reflective Newton method described in Coleman, T. F. and Y. Li, "An Interior, Trust Region Approach for Nonlinear Minimization Subject to Bounds," SIAM Journal on Optimization, Vol. 6, pp. 418-445 (1996), and Coleman, T. F. and Y. Li, (1994). "On the Convergence of Reflective Newton Methods for Large-Scale Nonlinear Minimization Subject to Bounds," Mathematical Programming, Vol. 67, Number 2, pp. 189-224. This method is suited for the nonlinear least squares optimization of the illustrative embodiment.

The optimizer is applied in two steps. The first step 100 estimates the Gaussian kernel parameters. The second step 98 includes the stray light/flux to estimate the parameters of the PSF 22 and re-estimation of the Gaussian parameters to account for the non-stray imperfections in the imaging system 14. The initial conditions for the parameters are chosen such that the PSF form is shift-invariant. In the illustrative embodiment, the optimization is iterated 1000 times at each step. The resulting image equation at step 96 is subtracted from the ideal image of step 92 at step 94. This operation results in a metric 104 which is the correction equation applied to the particular region of the field of view 74 of camera 64 to correct the images therein.

It should be understood that this approach may be applied to a number of regions over the field of view 74 of camera 64. Also, the process 86 may be applied to develop a metric 104 for multiple wavelengths. Finally, it should be understood that the process 86 may be applied to establish metrics at multiple settings of camera 64 including over the entire range of performance of camera 64. Thus, a number of multiple metrics 104 may be established for camera 64 to thereby improve the image quality as necessary for a given application.

Although certain illustrative embodiments have been described in detail above, variations and modifications exist within the scope and spirit of this disclosure as described and as defined in the following claims.

What is claimed is:

1. A method of determining the point-spread function of an imaging system, the method comprising
   capturing image data,
   establishing an idealized source spot,
   establishing a functional form model for effects of stray light, and
   optimizing the functional form model for the effects of stray light to estimate parameters of the functional form model to arrive at the point-spread function of the imaging system by minimizing a cost function, the cost function including the mathematical difference between an estimated image equation and the captured image data, wherein the estimated image equation is a function of the functional form model for the effects of stray light.

2. The method of claim 1, wherein the functional form model for the effects of stray light is shift-variant.

3. The method of claim 2, wherein the functional form model for the effects of stray light is rotationally invariant.

4. The method of claim 3, wherein the functional form model for the effects of stray light has less than six parameters.

5. The method of claim 2, wherein the functional form model for the effects of stray light has less than five parameters.

6. The method of claim 5 further comprising the steps of
   establishing a functional form model for the effects of diffraction and aberration,
   optimizing the functional form model for the effects of diffraction and aberration to estimate parameters of the functional form model,
   optimizing the functional form model for the effects of stray light to estimate the parameters of the functional form model while simultaneously re-estimating the parameters for the functional form model diffraction and aberration.

7. The method of claim 1, wherein the functional form model for the effects of stray light has less than five parameters.

8. The method of claim 1, wherein the functional form model for the effects of stray light is rotationally invariant.

9. The method of claim 1 further comprising the steps of
   establishing a functional form model for the effects of diffraction and aberration,
   optimizing the functional form model for the effects of diffraction and aberration to estimate parameters of the functional form model,
   optimizing the functional form model for the effects of stray light to estimate the parameters of the functional form model while simultaneously re-estimating the parameters for the functional form model diffraction and aberration.

10. The method of claim 1, wherein the cost function includes a component to compensate for shading.

11. The method of claim 10, wherein the cost function is calculated over a limited region.

12. The method of claim 11, wherein the cost function is estimated by considering the stray-light PSF within the target region is shift invariant and is equal to the PSF at the center of the target region.

13. The method of claim 12, wherein the optimization is iterated to reduce error.

14. The method of claim 13, wherein the step of establishing an idealized source spot includes thresholding a normally exposed image, and the step of establishing a captured image with reduced noise includes combining a normally exposed image and a scaled version of the corresponding overexposed image
   wherein the step of establishing an idealized source spot includes the steps of capturing a normally exposed image, capturing an overexposed image, summing the image data, and thresholding the image data to remove image noise.

15. The method of claim 8, wherein the step of establishing an idealized source spot further includes the step of assigning values between 0 and 1 to pixels that are neighbors of object pixels to account for partial illumination of the neighbor pixels.

16. A method of correcting an image captured by an image system comprising the steps of
   establishing a point-spread function for the image system by, (i) capturing image data within the image system, (ii)

establishing an idealized image, (iii) establishing an estimated image equation including a functional form model for effects of stray light, (iv) subtracting the captured image data from the estimated image equation to establish a metric to evaluate the fit of an estimated point-spread function, and (v) iterating the functional form model for the effects of stray light to reduce the metric to an acceptable level to thereby establish the point-spread function, and applying the point-spread function to captured image data to correct for the effects of stray light.

17. The method of claim 16, wherein the step of establishing a point-spread function for the image system further includes the steps of (vi) establishing a functional form model for the effects of diffraction and aberration, (vii) optimizing the functional form model for the effects of diffraction and aberration to estimate parameters of the functional form, (viii) optimizing the functional form model for the effects of stray light to estimate the parameters of the functional form model while simultaneously re-estimating the parameters for the functional form model for diffraction and aberration.

18. The method of claim 1, wherein the estimated image equation includes the sum of the functional form model for the effects of stray light and a second functional form model accounting for noise due to phenomena other than the effects of stray light.

19. The method of claim 1, wherein the cost function includes a weighting factor function directed to a weight for each pixel of the image data.

* * * * *

UNITED STATES PATENT AND TRADEMARK OFFICE
CERTIFICATE OF CORRECTION

PATENT NO.        : 8,396,320 B2
APPLICATION NO.   : 12/523351
DATED             : March 12, 2013
INVENTOR(S)       : Allebach et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 772 days.

Signed and Sealed this
First Day of September, 2015

Michelle K. Lee
*Director of the United States Patent and Trademark Office*